US008783392B2

(12) United States Patent  
Underwood

(10) Patent No.: US 8,783,392 B2  
(45) Date of Patent: Jul. 22, 2014

(54) TRACKED MOBILITY DEVICE

(71) Applicant: Travis Underwood, North Vernon, IN (US)

(72) Inventor: Travis Underwood, North Vernon, IN (US)

(73) Assignee: Freedom One Mobility LLC, North Vernon, IN (US)

( * ) Notice: Subject to any disclaimer, the term of this patent is extended or adjusted under 35 U.S.C. 154(b) by 0 days.

(21) Appl. No.: 13/765,182

(22) Filed: Feb. 12, 2013

(65) Prior Publication Data

US 2013/0153308 A1 Jun. 20, 2013

Related U.S. Application Data

(63) Continuation-in-part of application No. 12/849,897, filed on Aug. 4, 2010, now Pat. No. 8,371,403.

(60) Provisional application No. 61/231,160, filed on Aug. 4, 2009.

(51) Int. Cl.
*B62D 55/104* (2006.01)
*A61G 5/06* (2006.01)

(52) U.S. Cl.
CPC ............... *A61G 5/065* (2013.01); *A61G 5/066* (2013.01)
USPC ........................... 180/9.52; 180/6.5; 180/6.54

(58) Field of Classification Search
CPC .......... A61G 5/06; A61G 5/065; A61G 5/066
USPC ............. 16/47, 18, 45, 46; 180/9.52, 9.5, 9.1, 180/9.32, 9.36, 6.48, 6.5, 6.54, 907; 280/5.28, 47.34
See application file for complete search history.

(56) References Cited

U.S. PATENT DOCUMENTS

| | | |
|---|---|---|
| 3,068,950 A | 12/1962 | Davidson |
| 3,231,036 A | 1/1966 | Appenrodt |
| 3,259,200 A | 7/1966 | Maijala |
| 3,776,326 A | 12/1973 | Davin et al. |
| 4,077,483 A | 3/1978 | Randolph |
| 4,194,584 A | 3/1980 | Kress et al. |
| 4,674,584 A | 6/1987 | Watkins |
| 4,688,813 A | 8/1987 | Misawa et al. |
| 4,747,457 A | 5/1988 | Buscaiolo et al. |
| 4,898,256 A | 2/1990 | Lehner |
| 4,915,184 A | 4/1990 | Watkins |
| 4,960,180 A | 10/1990 | Livingston |
| 5,123,495 A | 6/1992 | Littlejohn et al. |
| 5,308,098 A | 5/1994 | Shea |

(Continued)

*Primary Examiner* — Tony Winner
*Assistant Examiner* — Jacob Knutson

(74) *Attorney, Agent, or Firm* — Woodard, Emhardt, Moriarty, McNett & Henry LLP

(57) ABSTRACT

A tracked mobility device includes: a) a frame supporting a seat; b) a pair of track drives connected to the frame, with each track drive including a powered center drive wheel, a front roller, a rear roller, and a flexible track, with the center drive wheel having a diameter that is at least 50% greater than the diameter of either the front roller or the rear roller, and c) a rear wheel assembly connected to the frame, with the rear wheel assembly having three wheels sharing a common axle, with the diameter of the center rear wheel being at least 10% larger than the diameter of the two outer rear wheels; d) a source of power to power said center drive wheels; and e) a controller effective for controlling the speed and direction of rotation of each of the track drives.

18 Claims, 12 Drawing Sheets

(56) References Cited

U.S. PATENT DOCUMENTS

| | | |
|---|---|---|
| 5,363,937 A | 11/1994 | James |
| 5,413,367 A | 5/1995 | Ochiai |
| 5,577,567 A | 11/1996 | Johnson et al. |
| 5,839,802 A | 11/1998 | Sheets |
| 6,225,167 B1 | 5/2001 | Yu et al. |
| 6,250,409 B1 * | 6/2001 | Wells .......................... 180/9.52 |
| 6,325,167 B1 | 12/2001 | Jiang |
| 6,357,765 B1 * | 3/2002 | Heien .......................... 280/5.26 |
| 6,604,590 B2 | 8/2003 | Foulk, Jr. |
| 6,913,103 B2 | 7/2005 | Kitasaka et al. |
| 7,036,894 B1 | 5/2006 | Woodall et al. |
| 7,111,697 B2 | 9/2006 | Brazier |
| 2002/0017403 A1 | 2/2002 | Phely |
| 2003/0121705 A1 | 7/2003 | Rau |
| 2003/0183428 A1 | 10/2003 | Hedeen |
| 2003/0226697 A1 | 12/2003 | Haringer |
| 2004/0216932 A1 | 11/2004 | Giovanetti et al. |
| 2006/0037789 A1 | 2/2006 | Kritman et al. |
| 2006/0237239 A1 | 10/2006 | Bruner et al. |
| 2007/0017713 A1 | 1/2007 | Sewell et al. |
| 2010/0122422 A1 * | 5/2010 | Hui .................................. 15/1.7 |

\* cited by examiner

TRACKED MOBILITY DEVICE

REFERENCES TO RELATED APPLICATIONS

This application is a continuation-in-part of applicant's pending U.S. patent application Ser. No. 12/849,897, filed Aug. 4, 2010, which claims the benefit of U.S. Provisional Application No. 61/231,160 filed, Aug. 4, 2009, both of which are hereby incorporated herein by reference.

FIELD OF THE INVENTION

The present invention relates generally to devices for transporting an individual, and more particularly to a personally mobility device that is powered by a track or pair of tracks.

BACKGROUND

Personal mobility devices are vehicles designed to transport one person at a time, usually with room for a small amount of cargo. These devices may be operated while standing, such as with the Segway Personal Transporter, or they may be operated while sitting, such as with a common wheel chair.

Personal mobility devices with wheels may be propelled either manually (by turning the wheels by the hand) or by various automated systems. For example, electric powered wheelchairs (EPWs) use electric motors to move the wheels. They are usually powered by 4 or 5 amp deep-cycle rechargeable batteries, similar to those used to power outboard boat engines.

EPWs are typically operated using a joystick on a controller that controls the speed and direction. The wheels may be turned at variable speed in either direction, giving the chair a zero-turning-radius capability and making navigation through relatively narrow pathways possible.

However, wheels present disadvantages, particularly when the terrain is soft or uneven, as may be the case outdoors. In soft ground, the weight of the vehicle and occupant causes the wheels to sink into the ground and become difficult to turn. On uneven terrain, including curbs and stairs, the wheels may be difficult to roll over a significant change in height.

One alternative to wheeled vehicles is a tracked vehicle that uses a continuous track instead of wheels. The tracks are in contact with a larger surface area than would generally be the case with wheels, and thus exert a lower force per unit area on the ground being traversed than a conventional wheeled vehicle of the same weight. This makes them particularly suitable for use on soft, low friction and uneven ground such as mud, ice and snow.

There are disadvantages to tracked vehicles too, though. For example, prior art tracked devices typically contact the ground with a long and wide footprint, and therefore require and use significant power to overcome the resistance of friction during movement. Also, tracked vehicles can cause significant damage to carpets or floors when used indoors, since the track presents a large contact area with the floor as described above. Further, the turning radius of a tracked vehicle is typically larger than the turning radius of a wheeled vehicle due to the length of the track.

Applicant's U.S. Pat. No. 8,371,403 sought to address problems associated with prior art mobility vehicles by providing, in one embodiment, a tracked mobility device comprising: a) a pair of independent, self-supported track drives having a ground contact area; wherein each of said independent, self-supported track drives comprises: i) a drive wheel; ii) a plurality of rollers; and iii) a flexible track; and iv) a frame; wherein said frame holds said drive wheel, said plurality of rollers, and said flexible track in an aligned orientation wherein the track drive may function as an independent, self-supported assembly; b) a body connected to said pair of independent track drives in a manner that allows each track drive to independently tilt upward or downward with respect to the body as the device moves forward or rearward on its tracks; c) a seat supported by said body; d) a controller to control the speed and direction of rotation of each of the track drives; e) a multi-directional wheel having a first, raised position above the plane of said planar ground contact area, and a second, lowered position below the plane of said planar ground contact area; and f) an actuator effective to lower said multi-directional wheel to its lowered position, wherein the actuator lowers said wheel an amount sufficient to raise at least part of said track drive ground contact areas from the ground when the device is resting on the ground without raising all of said track drive ground contact areas from the ground.

In another embodiment applicant's U.S. Pat. No. 8,371,403 provides a tracked mobility device, comprising: a) a first self-supported, independent track drive comprising: i) a first motor operably connected to a first drive shaft; ii) a first drive wheel connected to the first drive shaft; iii) a first plurality of rollers aligned with said first drive wheel; iv) a first track; and v) a first pair of spaced-apart frame members effective for holding the first plurality of rollers in an aligned orientation; wherein said frame members additionally assist in holding the first track drive together as a self-supported, independent assembly; b) a second self-supported, independent track drive comprising: i) a second motor operably connected to a second drive shaft; ii) a second drive wheel connected to the second drive shaft; iii) a second plurality of rollers aligned with said second drive wheel; iv) a second track; and v) a second pair of spaced-apart frame members effective for holding the second plurality of rollers in an aligned orientation; wherein said frame members additionally assist in holding the second track drive together as a self-supported, independent assembly; c) a body jointly supported by said first self-supported, independent track drive, and by said second self-supported, independent track drive in a manner that allows each track drive to independently tilt upward or downward with respect to the body as the device moves forward or rearward on its tracks; d) a seat supported by said body; and e) a controller to control the speed and direction of rotation of each of the track drives.

In yet a further embodiment applicant's U.S. Pat. No. 8,371,403 provides a tracked mobility device, comprising: a) a pair of track drives, each of said track drives defining a planar ground contact area, wherein said pair of planar ground contact areas are coplanar, wherein each of said ground contact areas including a forward ground contact area and a rearward ground contact area; b) a first castor wheel having a first, raised position above the plane of said ground contact areas, and a second, lowered position below the plane of said ground contact areas; c) a second castor wheel having a first, raised position above the plane of said ground contact areas, and a second, lowered position below the plane of said ground contact areas; d) a first actuator effective to lower said first castor wheel to its lowered position; e) a second actuator effective to lower said second castor wheel to its lowered position; wherein said first actuator and said second actuator cooperate to lower said first castor wheel and said second castor wheel an amount sufficient to raise one of said forward and rearward ground contact areas of each track drive from the floor when the device is resting on the floor without raising the other of said forward and rearward ground contact areas of each track drive from the floor; f) a body connected to each of said pair of track drives in a manner that allows each track drive to independently tilt upward or downward with respect to the body as the device moves forward or rearward on its tracks; g) a seat supported by said body; and h) a controller to control the speed and direction of rotation of each of the track drives.

A need continues to exist, however, for improvements to applicant's personal mobility vehicle to improve the low-friction, quick-turning, indoor and outdoor drivability of the device while still providing the superior off-road capability of a tracked vehicle. The present invention addresses that need.

SUMMARY OF THE INVENTION

In one aspect of the present invention there is provided a tracked mobility device comprising:
a) a frame supporting a seat;
b) a pair of track drives connected to said frame, with each track drive comprising or consisting essentially of a powered center drive wheel, a front roller, a rear roller, and a flexible track;
   wherein said center drive wheel has a first diameter, said front roller has a second diameter, and said rear roller has a third diameter,
   wherein said center drive wheel diameter is at least 20% greater than either said front roller diameter or said rear roller diameter, and
   wherein said second diameter may be equal to said third diameter;
c) a rear wheel assembly connected to said frame and comprising an inner wheel portion having an inner wheel diameter, and a pair of outer wheel portions having a diameter at least 10% smaller than said inner wheel diameter; and
d) a controller effective for controlling the speed and direction of rotation of each of the track drives.

The tracked mobility device may be constructed such that each track drive consists essentially of a powered center drive wheel, a front roller, a rear roller, and a flexible track; wherein said center drive wheel has a first diameter, said front roller has a second diameter, and said rear roller has a third diameter, wherein said center drive wheel diameter is at least 20% greater than either said front roller diameter or said rear roller diameter, and wherein said second diameter is equal to said third diameter.

The tracked mobility device may have a center drive wheel with a diameter that is at least 50% greater, and more preferably at least 80% greater, than either the front roller diameter or the rear roller diameter.

The tracked mobility device may have a center drive wheel with a diameter of between 8 inches and 12 inches. Similarly, the front roller may have a diameter between 4 inches and 8 inches, and the rear roller may have a diameter between 4 inches and 8 inches. In some preferred embodiments the tracked mobility device has a center drive wheel has a diameter of about 10 inches, the front roller has a diameter of about 5 inches, and the rear roller has a diameter of about 5 inches.

The centers (axle height) of the three wheels/rollers may be at the same height, or the centers of the front and/or rear rollers may be raised or lowered with respect to the height of the center wheel/roller. In the most preferred embodiments the wheel/roller sizes and center heights are selected so that the track forms a shallow "V" shape that contacts a flat, level ground surface only at a single "point" or small area that is less than the diameter of the center wheel/roller, yet contacts a soft or uneven surface with a larger contact area that keeps the vehicle from sinking too far into the soft terrain much like snow shoes keep a person from sinking into soft snow.

Further, the center drive wheel may comprise a plurality of outwardly extending ridges defining grooves therebetween. Similarly, the flexible track may comprise a plurality of inwardly extending ridges. The outwardly extending center drive wheel ridges and the inwardly extending flexible track ridges are sized and spaced such that the inwardly extending ridges fit in the grooves formed by the outwardly extending ridges to allow the center drive wheel ridges to mate with the track ridges as the center drive wheel pulls the track.

While the rear wheel assembly may comprise a single wheel, the tracked mobility device may have a rear wheel assembly that comprises three wheels sharing a common axle, wherein said three wheels comprises an inner wheel having an inner wheel diameter, a first outer wheel having a diameter at least 10% smaller than said inner wheel diameter, and a second outer wheel having a diameter at least 10% smaller than said inner wheel diameter.

The rear wheel assembly may have an inner wheel with a diameter of between 8 inches and 12 inches, a first outer wheel with a diameter of between 6 inches and 10 inches, and a second outer wheel with a diameter of between 6 inches and 10 inches. In some preferred embodiments the inner/center rear wheel may have a diameter of about 10 inches, the first outer rear wheel may have a diameter of about 8 inches, and a second outer rear wheel may have a diameter of about 8 inches.

As with the side tracks, the rear wheel assembly contacts the ground at a small "point" under the center rear wheel when the device is standing or moving on a hard, flat surface. However, the rear wheel assembly contacts the ground at a larger contact "area" under the center rear wheel and the two outer rear wheels when the device is standing or moving on a soft and/or uneven surface. This larger contact area keeps the vehicle from sinking too far into the soft terrain much like snow shoes keep a person from sinking into soft snow.

In one aspect of the present invention there is provided a mobility device with: 1) a pair of track drives that each consists essentially of a powered center drive wheel, a front roller, a rear roller, and a flexible track, with the center drive wheel having a diameter of about 10 inches, the front roller having a diameter of about 5 inches, and the rear roller having a diameter of about 5 inches; and 2) a rear wheel assembly that comprises three wheels sharing a common axle, wherein the three wheels comprise an inner wheel having a diameter of about 10 inches, a first outer wheel having a diameter of about 8 inches, and a second outer wheel having a diameter of about 8 inches.

DESCRIPTION OF PREFERRED EMBODIMENTS

Figure 1:
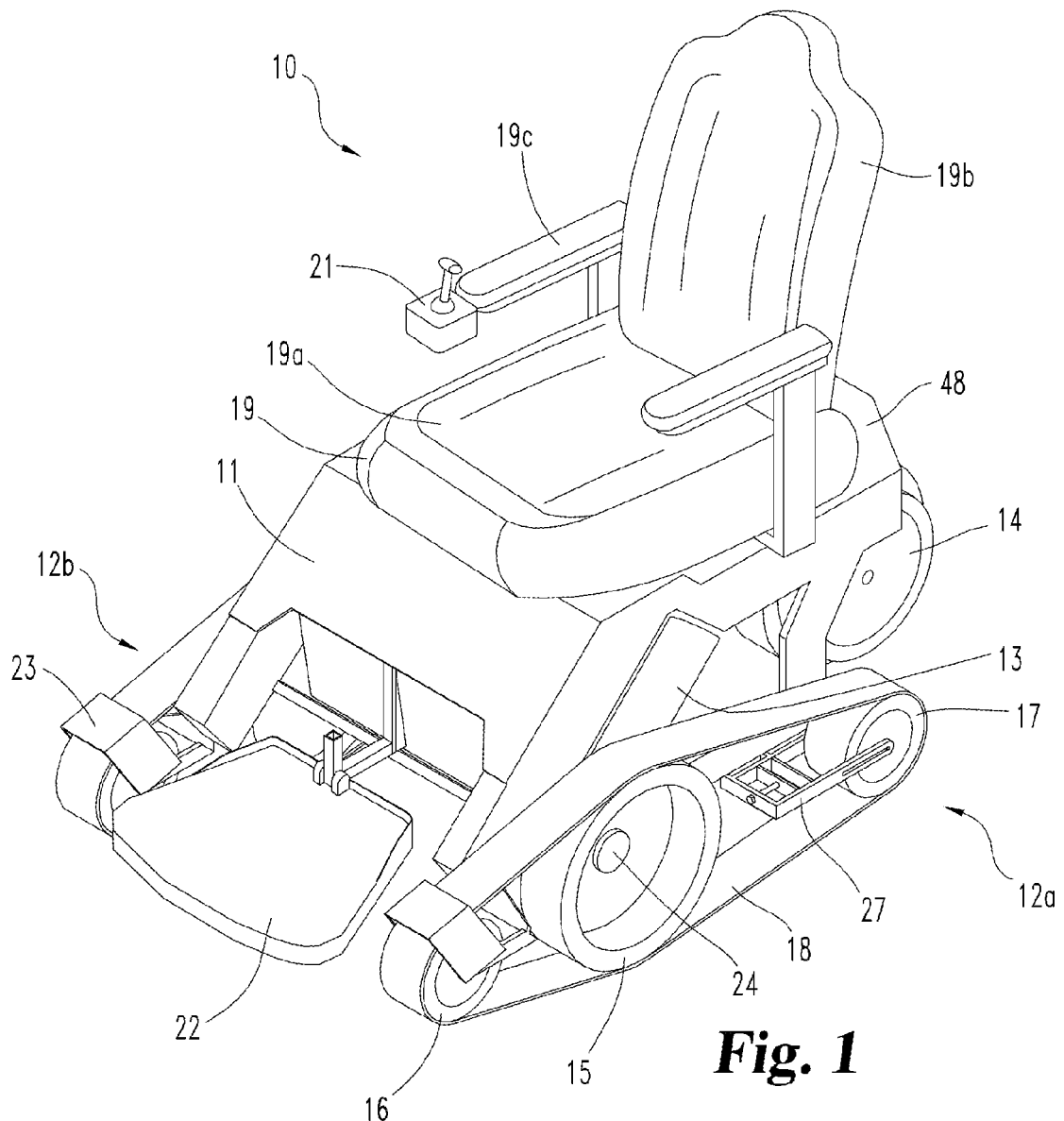
FIG. 1 is a perspective view of the tracked mobility device of the present invention according to one preferred embodiment.

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Applicant's co-pending U.S. patent application Ser. No. 12/849,897, filed Aug. 4, 2010, describes a tracked mobility device having a pair of self-supported, independent track drives, a body, controls, and a seat. Each of the track drives includes a flexible track, a drive wheel, and a plurality of rollers positioned between a pair of spaced-apart frame members. The body may be mounted on the pair of self-supported, independent track drives with a flexible mount that allows each track drive to flex independently with respect to the body. Thus, each track may independently tilt upward or downward as the device moves forward or rearward on its tracks.

In one preferred embodiment of the previously-described tracked mobility device, a rear, multi-directional wheel having a first, raised position above the plane of the planar ground contact area, and a second, lowered position below the plane of the planar ground contact area, is included. The rear wheel is controlled by an actuator for lowering the wheel to its lowered position. The actuator is effective to lower the multi-directional wheel an amount sufficient to raise part of the planar ground contact area from the ground without raising all of the planar ground contact area from the ground. When so positioned, the vehicle contacts the ground at three places: a small (forward or rearward) portion of each track drive, and the free-spinning multi-directional wheel. This allows the vehicle to move with significantly less track contacting the ground than would be the case with conventional track drive systems, improving vehicle efficiency and protecting floors from damage by the track.

New embodiments of the inventive device provide alternative side track assemblies and an alternative rear wheel assembly. The alternative side track assemblies may each comprise or consist essentially of one powered drive wheel, two unpowered rollers, and a flexible track. The powered drive wheel is preferably the center wheel, and the unpowered rollers are preferably the front and rear rollers. The center wheel/roller (whether powered or unpowered) has a first diameter, the front wheel/roller has a second diameter, and the rear wheel/roller has a third diameter, with the first diameter being at least 20% greater than either the second diameter or the third diameter. More preferably the first diameter is at least 50% greater than either the second diameter or the third diameter, and most preferably the first diameter is at least 80% greater than either the second diameter or the third diameter. The second diameter may be equal to the third diameter, or the two diameters may be different.

The alternative rear wheel assembly may comprise an inner/center wheel portion having an inner wheel diameter, and a pair of outer wheel portions having a diameter at least 10% smaller than the inner wheel diameter. Most preferably, the inner/center wheel portion comprises a separate center wheel, and the two outer wheel portions comprise a pair of separate outer wheels, with all three wheels being mounted to a single axle. The rear wheel assembly is pivotable to allow the rear wheel assembly to track properly when the device is turning or moving in a direction other than straight forward.

When the device is on a flat, hard surface, the device contacts the "ground" at three points: 1) the point at the bottom of the left side track below the center drive wheel; 2) the point at the bottom of the right side track below the center drive wheel; and 3) the point at the bottom of the center wheel of the rear wheel assembly. This "three-point" contact provides sufficient traction with reduced friction to improve drive efficiency.

When the device is on a soft and/or uneven surface, the device may contact the "ground" at three relatively larger areas: 1) the area starting at the bottom of the left side track below the center drive wheel and extending forward and/or rearward for a distance depending on the depth to which the left-side track has sunk in the soft surface; 2) the area starting at the bottom of the right side track below the center drive wheel and extending forward and/or rearward for a distance depending on the depth to which the right-side track has sunk in the soft surface; and 3) the area starting at the bottom of the center wheel of the rear wheel assembly and extending outward to include the area below the outer portions of the rear wheel assembly. This increased contact area provides superior traction in soft or uneven terrain, but only reduces drive efficiency when that increased traction is actually needed.

In this written description of the invention reference may be made to a contact "point" or a contact "area" or some other zone or surface of contact. However, it is to be appreciated that even when the device is on a completely hard and flat surface, the contact "points" are actually small areas that are typically substantially linear according to the width of the relevant wheel and/or track. Accordingly, applicant's reference to one or more contact "points" is not intended to be literally limited to points of contact, but is instead intended to refer to the relatively small contact areas that obtain when the device is standing or moving on a flat, hard surface.

Reference will now be made to various embodiments and/or features. It is to be appreciated that any or all of these embodiments and/or features may be used alone or in combination with any other embodiment or feature described herein or disclose in applicant's co-pending U.S. patent application Ser. No. 12/849,897. For example, the side track assemblies disclosed herein may be mounted directly to a frame, or they may be mounted to a frame with the independent mounting assemblies previously shown and described.

1. The Track Drive

Two track drives are preferably used on the inventive mobility device. Each track drive preferably comprises a powered center drive wheel, a front roller, a rear roller, and a flexible track.

The center drive wheel is preferably a flat- or ridged-surface wheel with an outer diameter of between 6 inches and 14 inches, and more preferably between about 8 inches and 12 inches, and most preferably about 10 inches. The center drive wheel is preferably powered by a motor that is mounted to the vehicle frame. The motor is effective for turning a drive shaft or axle, which turns the drive wheel. The motor may be an electric motor such as an AC- or DC-battery powered motor. The motor is effective for moving the drive shaft/axle and associated track in the forward or rearward direction.

Each motor preferably drives one drive shaft, which preferably comprises a ¾ inch axle. The drive shaft may be driven directly by the motor, or it may be driven by a mechanical linkage. Gears to adjust the rotational speed of the drive shaft are preferably included.

The front and rear rollers are preferably free-rolling rollers that extend the track distance and properly position the track ends without restricting track movement. The front roller preferably has a diameter between about 2 inches and 8 inches, and more preferably between about 4 inches and 6 inches, and most preferably about 5 inches.

In the preferred embodiments the center drive wheel diameter is at least 20% greater than either said front roller diameter or said rear roller diameter. In the more preferred embodiments the center drive wheel diameter is at least 50% greater than either said front roller diameter or said rear roller diameter, and in the most preferred embodiments the center drive wheel diameter is at least 100% greater than either said front roller diameter or said rear roller diameter. The front roller diameter may be equal to the rear roller diameter, or those two diameters may be different.

The centers (axle height) of the three wheels/rollers may be at the same height, or the centers of the front and/or rear rollers may be raised or lowered with respect to the height of the center wheel/roller. In some preferred embodiments the front roller and the center drive wheel have their centers (axles) at the same height relative to a flat, level surface, but the rear roller has its center at a different, and preferably lower, height. In other embodiments the center drive wheel and the rear roller have their centers (axles) at the same height relative to a flat, level surface, but the front roller has its center at a different, and preferably higher, height.

In the most preferred embodiments the wheel/roller sizes and center heights are selected so that the track forms a shallow "V" shape that contacts a flat, level ground surface only at a single "point" or small area that is less than the diameter of the center wheel/roller.

In one embodiment the drive wheels may include a groove to facilitate alignment of the track. In another embodiment the track may be aligned on the drive wheel and rollers with an alignment guide that keeps the track centered over the drive wheel and rollers.

The drive wheels function to turn the flexible track of the track drive, thereby moving the device in either a forward or a rearward direction. Each drive wheel is capable of moving at a variable speed in either a forward or a rearward direction. In one embodiment the drive wheel may include outwardly extending ridges that define lateral grooves on the outer surface of the drive wheel. The lateral grooves cooperate with corresponding ridges in the track to provide a no-slip connection between the drive wheel and the track.

Each track comprises a flexible band that moves continuously as the drive wheel rotates. The tracks may be made of any material with the flexibility and strength to drive a personal mobility vehicle over grass, gravel, concrete, wood, carpet, etc., and is preferably made of a heavy-weight rubber or synthetic material such as is used to make automobile tires. The material preferably includes fibers woven into the material, such as metal, nylon or other synthetic fibers.

Each track may have a cross section shaped as a "T" so that the track can be aligned in grooves in the drive wheel and/or the idler and/or carrier rollers. When the tracks have a "T"-shaped cross section, the track defines a horizontal portion and a vertically-extending portion. The horizontal portion may have a width that extends slightly beyond the width of the rollers, such as a four-inch-wide track for three-inch-wide rollers. The vertically-extending portion is sized to be accepted in grooves of the rollers, and is accordingly preferably about ¾ inch tall.

In one embodiment the vertical portion of the "T" has a tapered shape to facilitate alignment with the roller grooves. In that embodiment it is preferred that the vertical end (bottom) portion of the "T" is slightly more narrow than the (upper) portion of the "T" that connects with the horizontal portion of the track. For example, the bottom end portion may be ½ inch wide when the upper portion that connects with the horizontal part of the track is ¾ inch wide.

As indicated above, the inner surface of the track may include a series of ridges/grooves that cooperate with corresponding ridges/grooves on the outer surface of the center drive wheel. Additionally or alternatively the outer surface of the track may be smooth, or it may be ridged or provided with other traction-improving features.

As indicated above and as shown in the drawings, the flexible track contacts the ground at a small "point" under each center drive wheel when the device is standing or moving on a hard, flat surface. Conversely, the flexible track contacts the ground at a larger contact "area" under the center drive wheel and extending forward toward the front roller and rearward toward the rear roller when the device is standing or moving on a soft and/or uneven surface. The extended or enlarged contact area keeps the vehicle from sinking too far into the soft terrain much like snow shoes keep a person from sinking into soft snow.

2. The Rear Wheel Assembly

The mobility device also includes a rear wheel assembly that functions as the third contact point when the vehicle is on a hard, flat surface. The rear wheel assembly comprises an inner wheel portion having an inner wheel diameter, and a pair of outer wheel portions having a diameter at least 10% smaller than said inner wheel diameter.

Most preferably, the rear wheel assembly comprises three wheels sharing a common axle. The three wheels may therefore be identified as the center or inner rear wheel, and the two outer rear wheels.

The center rear wheel preferably has a diameter of between 8 inches and 12 inches, with a diameter of about 10 inches being more preferred. The two outer wheels preferably have a diameter of between 6 inches and 10 inches, with a diameter of about 8 inches being more preferred.

In the most preferred embodiments the first outer wheel has a diameter at least 10% smaller than the diameter of the center rear wheel. Similarly, the second outer wheel preferably has a diameter at least 10% smaller than the diameter of the center rear wheel. In alternative embodiments the two outer rear wheels have a diameter at least 20% smaller than the diameter of the center rear wheel.

As shown in the drawings, the rear wheel assembly contacts the ground at a small "point" under the center rear wheel when the device is standing or moving on a hard, flat surface. Conversely, the rear wheel assembly contacts the ground at a larger contact "area" under the center rear wheel and the two outer rear wheels when the device is standing or moving on a soft and/or uneven surface. This larger contact area keeps the vehicle from sinking too far into the soft terrain much like snow shoes keep a person from sinking into soft snow.

The rear wheel assembly is preferably connected to the vehicle frame with a fork that pivots with respect to the frame. This allows the rear wheels to track properly regardless of the direction in which the vehicle is moving.

3. The Frame/Body And Controls

The mobility device includes a frame or body to which the two track drives and the rear wheel assembly are attached. The frame/body may be made of metal, plastic, composite, or some other material appropriate for covering the elements that are housed in the body.

The dimensions of the body may vary according to the desired size of the device, but in one preferred embodiment the body has a length of about 22 inches to 24 inches, and a width of about 16 inches to 18 inches. The height of the frame is preferably between about 10 inches and about 16 inches.

In one embodiment the body supports a seat. The seat may be a bench seat, or it may have a back. Arms may be included if desired, and may be sized to accommodate controls that are easily accessible by the user's hand(s).

The device may include controls to control the direction and speed at which each track moves. The device may also include controls to control the actuator(s) which lower the multi-directional wheel(s). The controls may be operated by a joystick which moves forward to move both tracks forward, or moves backward to move both tracks backward, or moves to the left to move the right track forward and the left track backward, or moves to the right to move the left track forward and the right track backward, or any combination of speed and direction for each track. Joystick controls which control the speed and direction of rotation of each drive shaft, and thus of each track, are known to the art. Alternatively, other controls effective to control the speed and/or direction of rotation of each track may be incorporated into the device. Additionally, readouts such as LED readouts to indicate operating conditions such as battery life may be included.

In a further embodiment of the present invention, one or more side hand rails may be included. Such handrails are preferably provided below the level of the seat so that the user may slide in or out from the side without being blocked by the handrail.

In yet a further embodiment of the present invention the seat is pivotable on the frame. Most preferably, the seat is pivotable for at least about 90° in each direction to enable a user to enter and/or exit the vehicle more easily from the side. When side hand rails are included, the complete seat assembly, including handrails, may be pivotable with respect to the frame.

In an alternative embodiment of the present invention the front "roller" may be a powered wheel and the center and rear wheels/rollers may be unpowered. In that embodiment the tracked mobility device, comprises:

a) a frame supporting a seat;
b) a pair of track drives connected to said frame, with each track drive comprising a powered front wheel, an unpowered center roller, an unpowered rear roller, and a flexible track;
   wherein said center roller drive wheel has a first diameter, said front wheel has a second diameter, and said rear roller has a third diameter,
   wherein said center roller diameter is at least 20% greater than either said front wheel diameter or said rear roller diameter, and
   wherein said second diameter may be equal to said third diameter;
c) a rear wheel assembly connected to said frame and comprising an inner wheel portion having an inner wheel diameter, and a pair of outer wheel portions having a diameter at least 10% smaller than said inner wheel diameter; and
d) a controller effective for controlling the speed and direction of rotation of each of the track drives.

In yet a further alternative embodiment of the present invention the rear "roller" may be a powered wheel and the front and center wheels/rollers may be unpowered. In that embodiment the tracked mobility device, comprises:

a) a frame supporting a seat;
b) a pair of track drives connected to said frame, with each track drive comprising an unpowered front roller, an unpowered center roller, a powered rear wheel, and a flexible track;
   wherein said center roller has a first diameter, said front roller has a second diameter, and said rear wheel has a third diameter,
   wherein said center roller diameter is at least 20% greater than either said front roller diameter or said rear wheel diameter, and
   wherein said second diameter may be equal to said third diameter;
c) a rear wheel assembly connected to said frame and comprising an inner wheel portion having an inner wheel diameter, and a pair of outer wheel portions having a diameter at least 10% smaller than said inner wheel diameter; and
d) a controller effective for controlling the speed and direction of rotation of each of the track drives.

In yet a further embodiment of the present invention either or both of the front and rear rollers/wheels (whether powered or unpowered) may have a diameter such that the center wheel diameter (whether powered or unpowered) is not at least 20% greater, and may even be smaller, than the diameter of the larger roller, but the larger roller is raised with respect to the level of the center wheel/roller such that the track contacts the ground only at the "point" or area below the center drive wheel/roller when the device is on a hard, flat surface.

Referring now to the drawings, FIG. 1 shows the tracked mobility device of the present invention according to one preferred embodiment. Tracked mobility device 10 includes a frame 11, a pair of track assemblies 12a and 12b, and a rear wheel assembly 14. A motor 13 or other source of power is provided to power the center drive wheel 15 of each track drive. Front roller 16 and rear roller 17 cooperate with center drive wheel 15 to provide a support for flexible track 18. A guide 23 may be provided to help keep the track aligned over drive wheel 15 and rollers 16 and 17.

Seat 19 may include a bench portion 19a, a back portion 19b, and one or more arms 19c. A controller 21 may be provided on one of the arms. A foot rest 22 may be provided at the front of the frame.

Figure 2:
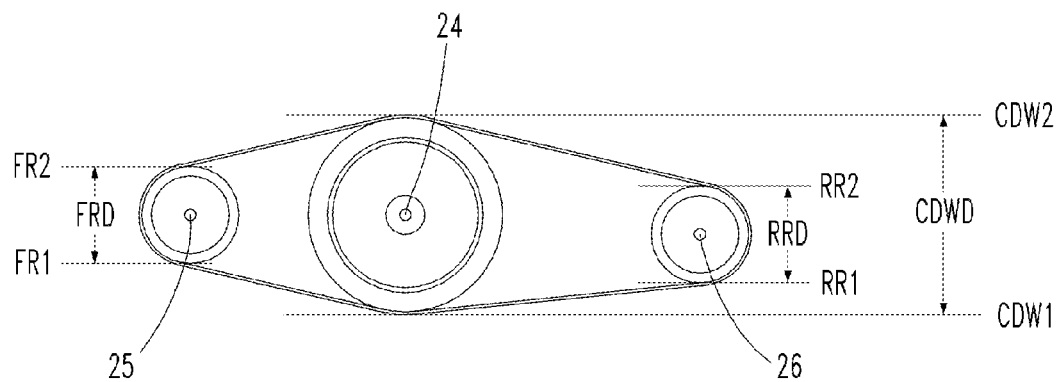
FIG. 2 is a side elevational view of one embodiment of a drive track for the tracked mobility device of the present invention.

FIG. 2 is a side elevational view of one embodiment of a drive track for the tracked mobility device of the present invention. Track drive 12 includes a center drive wheel 15 mounted to powered drive axle 24. Center drive wheel 15 has a diameter CDWD defined by the distance between the bottom CDW1 and the top CDW2 of the wheel. Front roller 16 is mounted to front roller axle 25 and has a diameter FRD defined by the distance between the bottom FR1 and the top FR2 of the roller. Rear roller 17 is mounted to rear roller axle 26 and has a diameter RRD defined by the distance between the bottom RR1 and the top RR2 of the roller.

Figure 3:
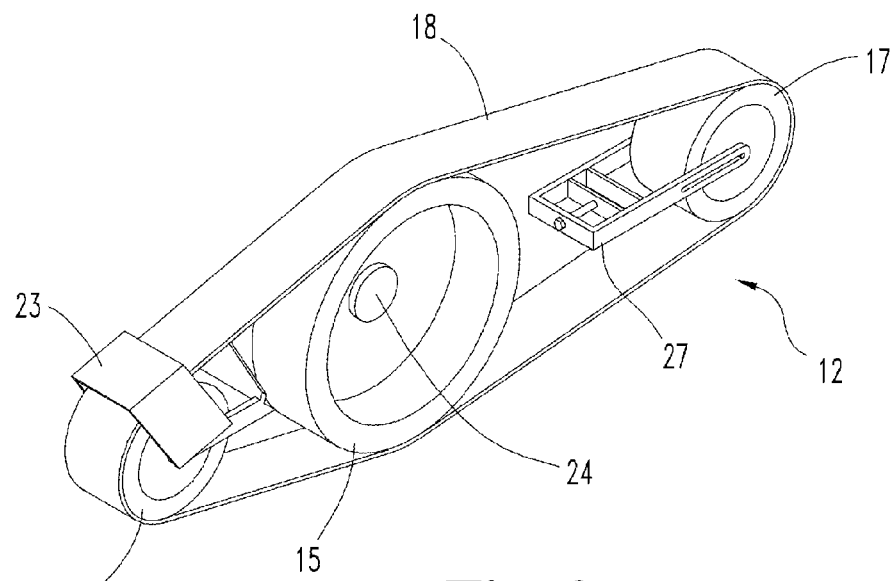
FIG. 3 is a perspective view of one embodiment of a drive track for the tracked mobility device of the present invention.

FIG. 3 is a perspective view of one embodiment of a drive track for the tracked mobility device of the present invention. Track drive 12 includes powered center drive wheel 15, front roller 16, and rear roller 17. Track guide 23 and rear roller adjustment mechanism 27 are provided on the illustrated track drive.

Figure 4:
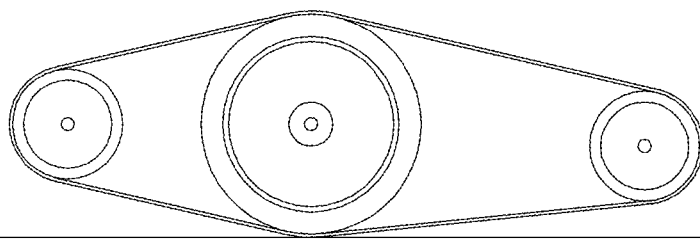
FIG. 4 is a side elevational view of one embodiment of a drive track for the tracked mobility device of the present invention, showing the track moving on a hard, flat surface.

FIG. 4 is a side elevational view of one embodiment of a drive track for the tracked mobility device of the present invention, showing the track moving on a hard, flat surface. The contact area is relatively small, and includes the area or "point" at the bottom of the track below the center drive wheel.

Figure 5:
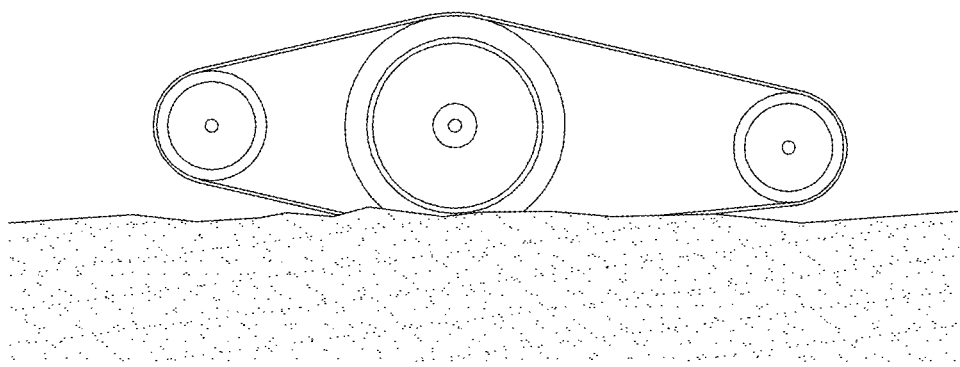
FIG. 5 is a side elevational view of one embodiment of a drive track for the tracked mobility device of the present invention, showing the track moving on a soft, irregular surface.

FIG. 5 is a side elevational view of one embodiment of a drive track for the tracked mobility device of the present invention, showing the track moving on a soft, irregular surface. The contact area is relatively larger, and includes the area at the bottom of the track below the center drive wheel and extending forward and/or rearward toward the front and rear rollers for a distance depending on the depth to which the track has sunk in the soft surface. This extended contact area keeps the vehicle from sinking too far into soft terrain much like snow shoes keep a person from sinking into soft snow.

Figure 6:
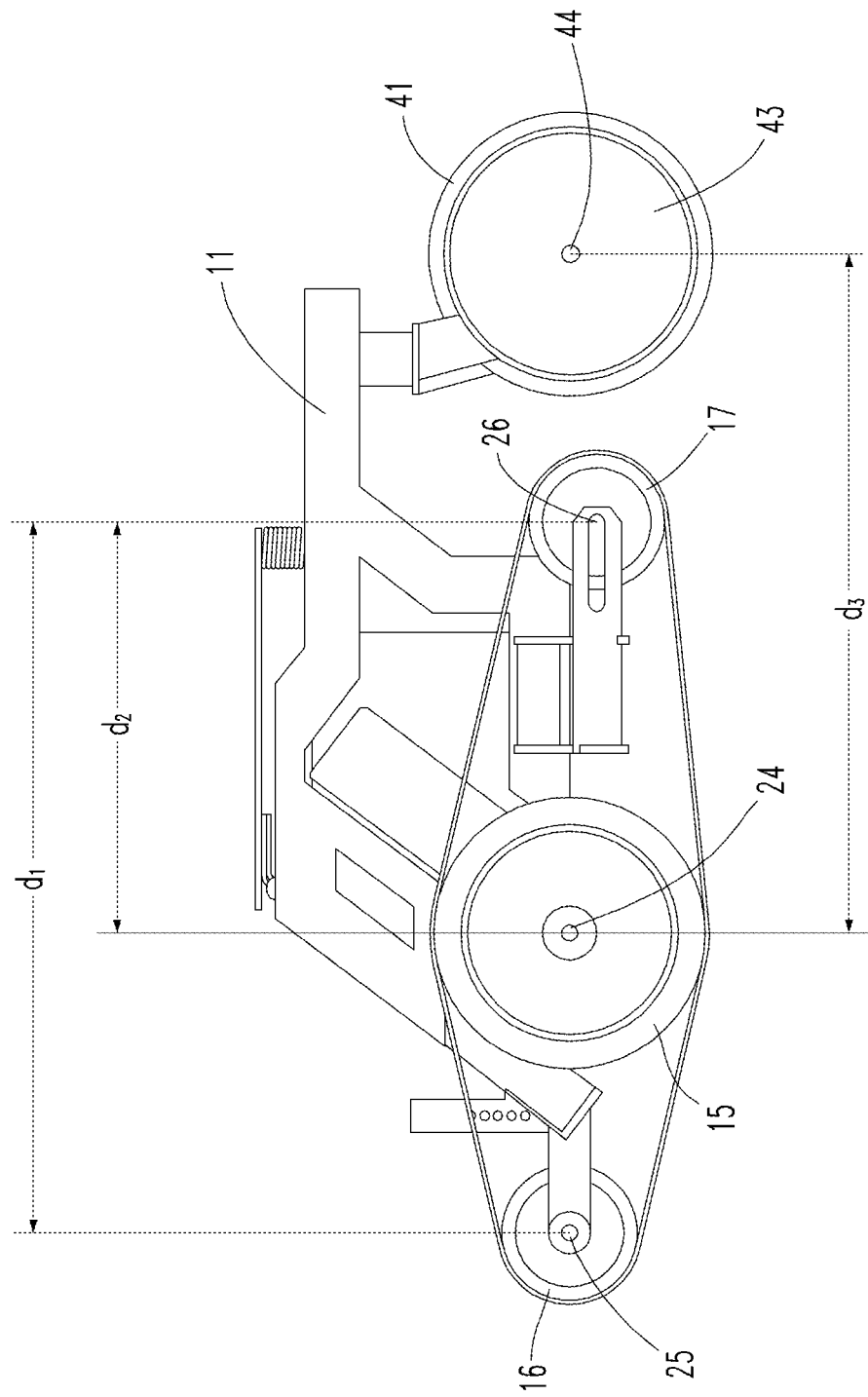
FIG. 6 is a side elevational view of one embodiment of the frame and a track drive of the tracked mobility device of the present invention.

FIG. 6 is a side elevational view of one embodiment of the frame and a track drive of the tracked mobility device of the present invention. Distance d1 is the distance between the front and rear roller axles, and is preferably between about 24 and 30 inches, and is most preferably about 26 inches. Distance d2 is the distance between the center drive wheel axle and the rear roller axle, and is preferably between about 12 and 18 inches, and is most preferably about 15 inches. Distance d3 is the distance between the center drive wheel axle and the rear wheel assembly, and is preferably between about 22 inches and about 28 inches, and is most preferably about 24 inches.

Figure 7:
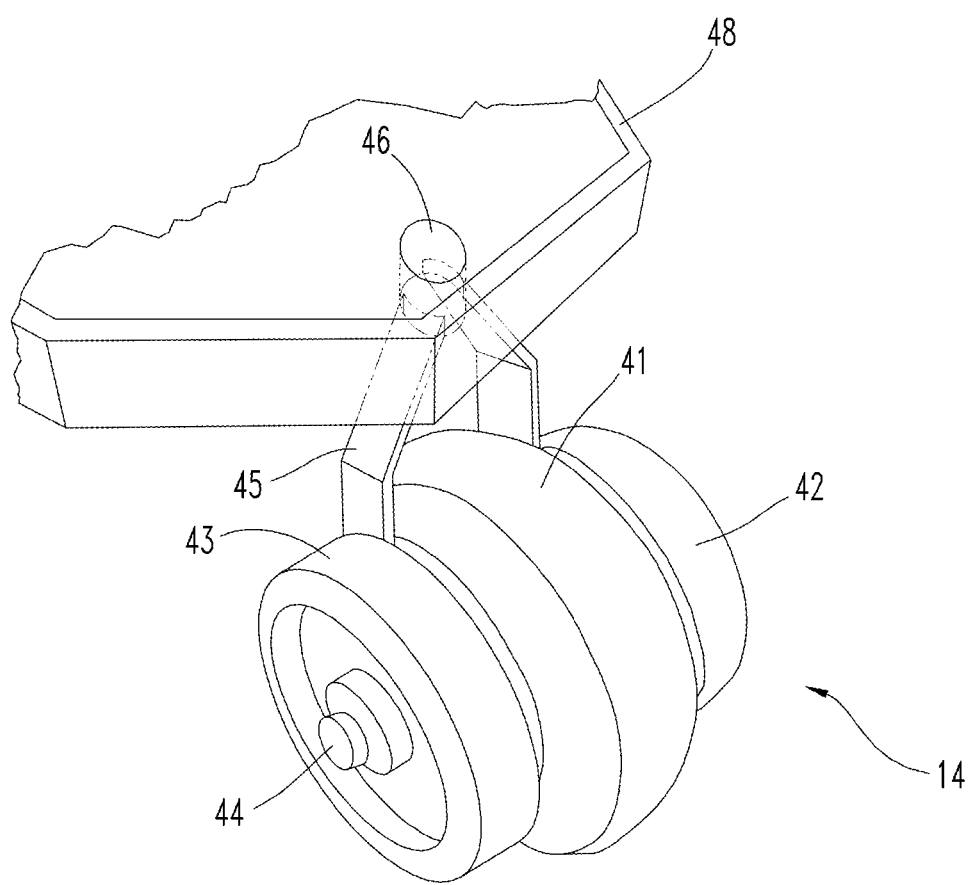
FIG. 7 is a perspective view of one embodiment of a rear wheel assembly for the tracked mobility device of the present invention.

FIG. 7 is a perspective view of one embodiment of a rear wheel assembly for the tracked mobility device of the present invention. Rear wheel assembly 14 includes center rear wheel 41, and two outer rear wheels 42 and 43. The three rear wheels are all mounted to rear axle 44. A fork 45 or other mounting bracket mounts the rear wheel assembly to the rear portion 48 of vehicle frame 11. A pivot 46 may be provided to allow rear wheel assembly 14 to pivot with respect to frame 11.

Figure 8:
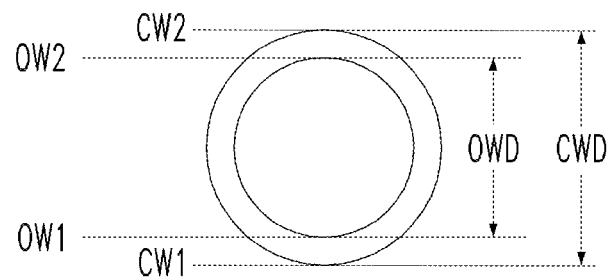
FIG. 8 is a side elevational view of one embodiment of a rear wheel assembly for the tracked mobility device of the present invention.

FIG. 8 is a side elevational view of one embodiment of a rear wheel assembly for the tracked mobility device of the present invention. Center rear wheel 41 has a diameter CWD defined by the distance between the bottom CW1 and the top CW2 of the center rear wheel. Outer rear wheels 42 and 43 may each have a diameter OWD defined by the distance between the bottom OW1 and the top OW2 of the outer rear wheel.

Figure 9:
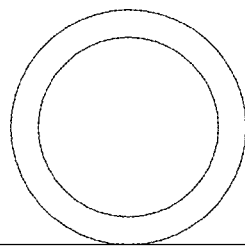
FIG. 9 is a side elevational view of one embodiment of a rear wheel assembly for the tracked mobility device of the present invention, showing the rear wheels moving on a hard, flat surface.

FIG. 9 is a side elevational view of one embodiment of a rear wheel assembly for the tracked mobility device of the present invention, showing the rear wheels moving on a hard, flat surface. The contact area is relatively small, and includes the area or "point" at the bottom of the center rear wheel. Since the outer rear wheels share an axle with the center rear wheel, and since the outer rear wheels have a diameter that is smaller than the diameter of the center rear wheel, the outer rear wheels do not contact the ground when the vehicle is standing or moving on a hard, flat surface.

Figure 10:
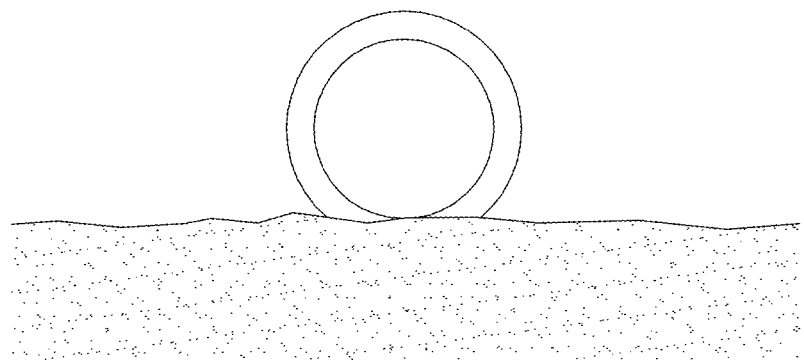
FIG. 10 is a side elevational view of one embodiment of a rear wheel assembly for the tracked mobility device of the present invention, showing the rear wheels moving on a soft, irregular surface.

FIG. 10 is a side elevational view of one embodiment of a rear wheel assembly for the tracked mobility device of the present invention, showing the rear wheels moving on a soft, irregular surface. The contact area is larger than the contact area of FIG. 9, and includes the area at the bottom of the center rear wheel and the area at the bottom of each of the two outer rear wheels. As with the track drives, this larger contact area helps keep the vehicle from sinking too far into soft terrain much like snow shoes keep a person from sinking into soft snow.

Figure 11:
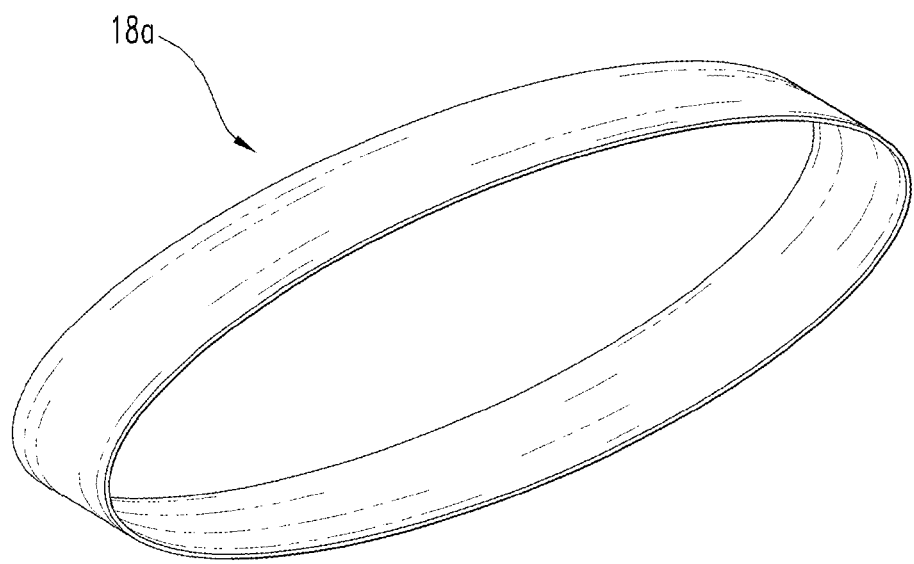
FIG. 11 is a perspective view of a flexible track for use on the tracked mobility device of the present invention according to one preferred embodiment.

FIG. 11 is a perspective view of a flexible track for use on the tracked mobility device of the present invention according to one preferred embodiment. Flexible track 18a has a smooth outer surface.

Figure 12:
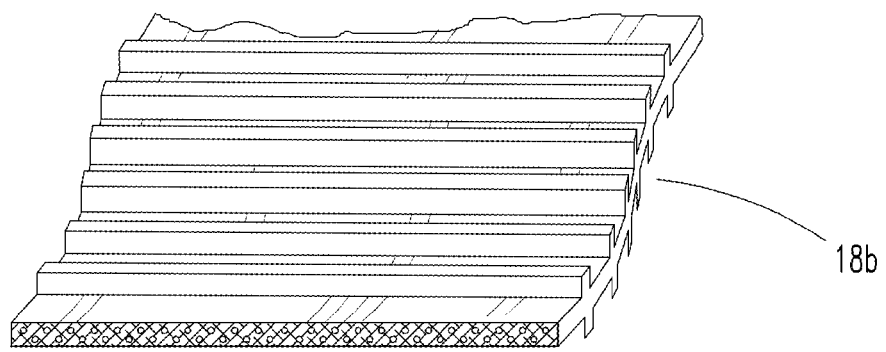
FIG. 12 is a perspective view of a flexible track for use on the tracked mobility device of the present invention according to an alternative preferred embodiment.

FIG. 12 is a perspective view of a portion of a flexible track 18b for use on the tracked mobility device of the present invention according to an alternative preferred embodiment. The illustrated flexible track includes ridges extending upward and downward to improve gripping with the drive wheel and with the ground.

Figure 13:
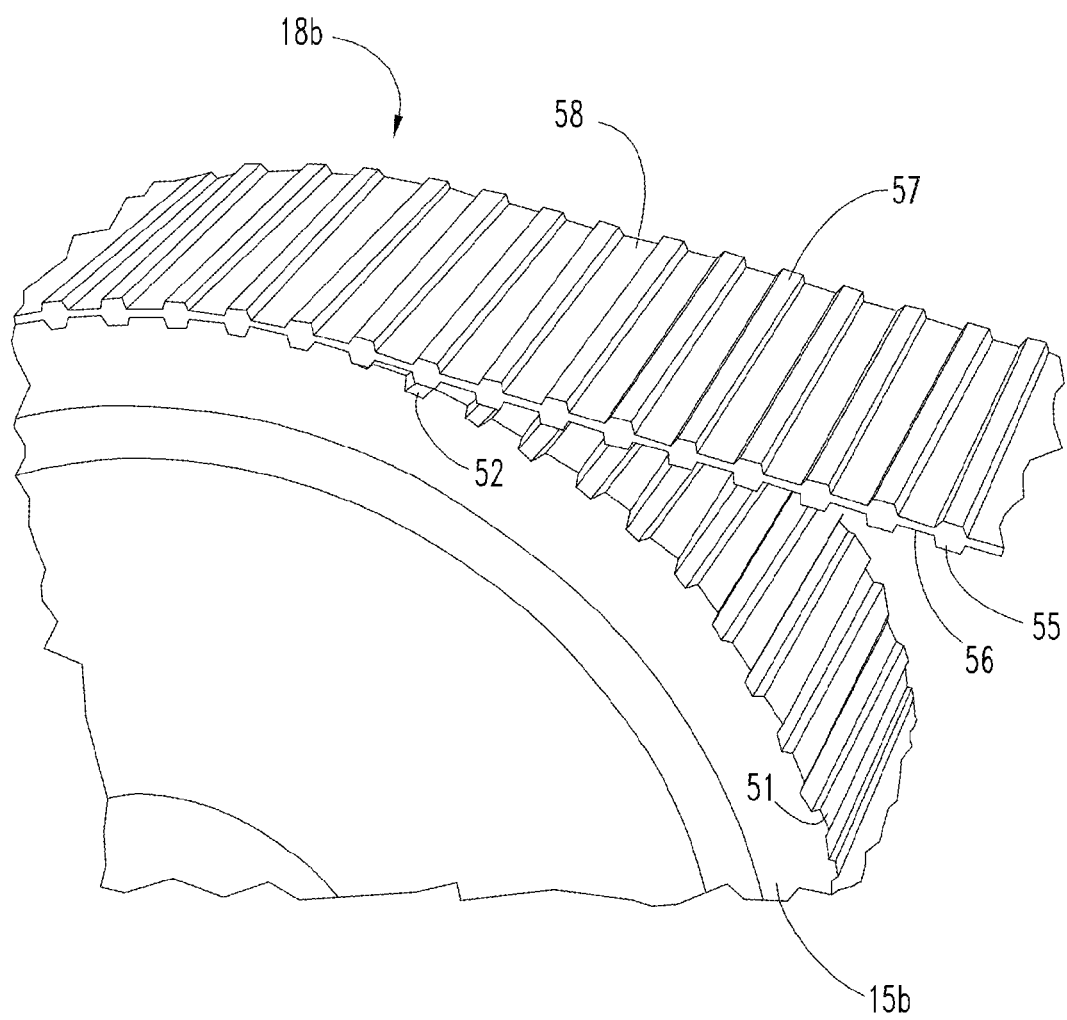
FIG. 13 illustrates how the ridges of a ridged track may cooperate with the grooves of a grooved drive wheel to facilitate superior gripping between the drive wheel and the flexible track.

FIG. 13 illustrates how the ridges of a ridged track may cooperate with the grooves of a grooved drive wheel to facilitate superior gripping between the drive wheel and the flexible track. Center drive wheel 15b includes a series of outwardly extending ridges 51 defining a plurality of grooves 52 effective for gripping corresponding ridges on a flexible track. Flexible track 18b includes a series of inwardly extending ridges 55 defining a plurality of inward grooves 56 effective for cooperating with center drive wheel ridges 51. Flexible track 18b may also include outwardly extending ridges 51 defining a plurality of grooves 58 effective for improving the grip of the vehicle on certain terrain.

Figure 14:
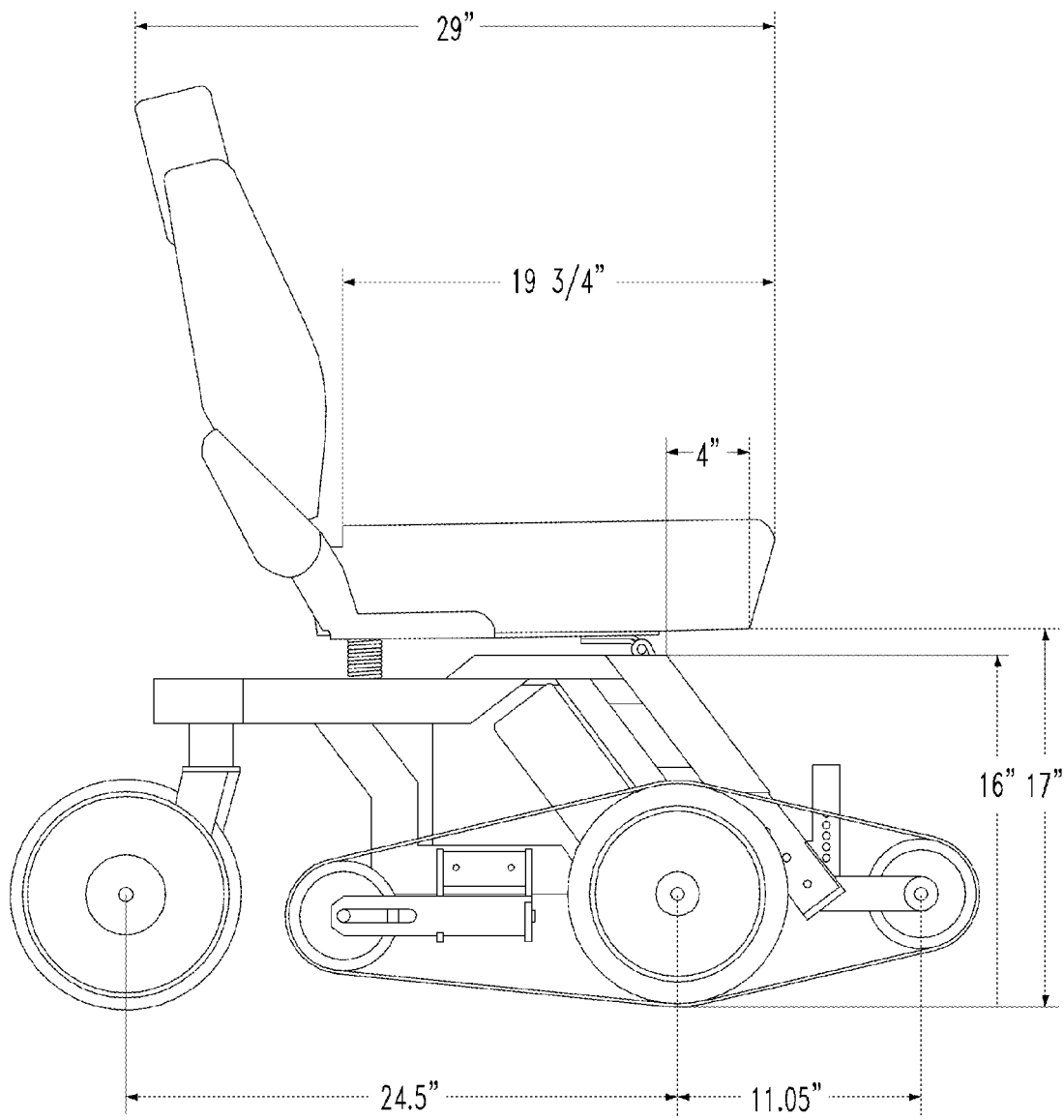
FIG. 14 is a side elevational view of one embodiment of the tracked mobility device of the present invention, showing certain preferred dimensions.

FIG. 14 is a side elevational view of one embodiment of the tracked mobility device of the present invention, showing certain preferred dimensions. In particular, frame length 36 and frame height 16 are indicated. Device length 43 is also indicated.

Figure 15:
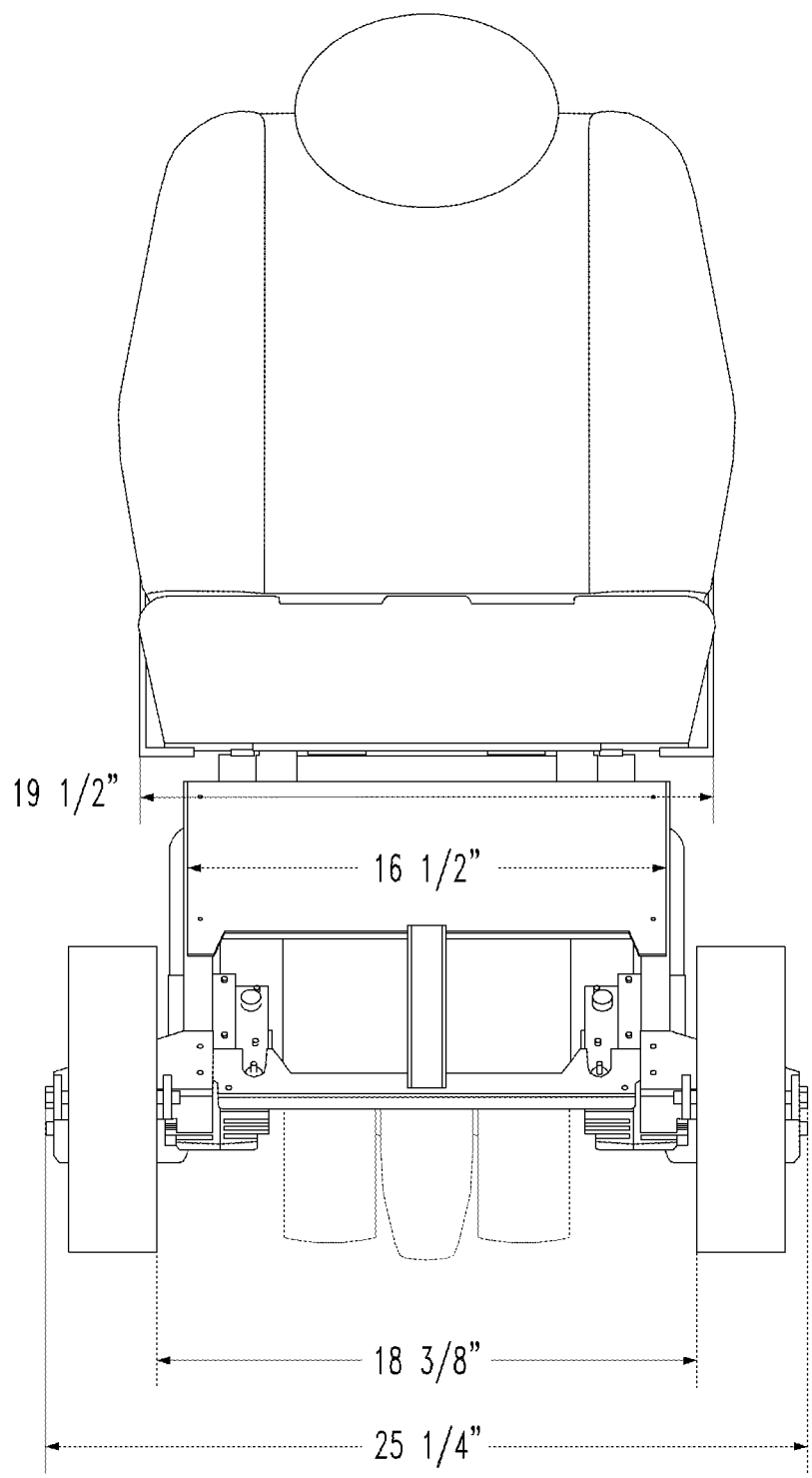
FIG. 15 is front elevational view of one embodiment of the tracked mobility device of the present invention, showing certain preferred dimensions.

FIG. 15 is front elevational view of one embodiment of the tracked mobility device of the present invention, showing certain preferred dimensions. In particular, frame width 18 and device width 25 are indicated.

Figure 16:
FIG. 16 is a perspective view of one embodiment of the tracked mobility device of the present invention, showing the embodiment that includes a side handrail.

FIG. 16 is a perspective view of another embodiment of the inventive racked mobility device, showing a pair of optional side handrails. In the illustrated embodiment the handrails are provided below the level of the seat so that the user may slide in or out from the side without being blocked by the handrail.

Figure 17:
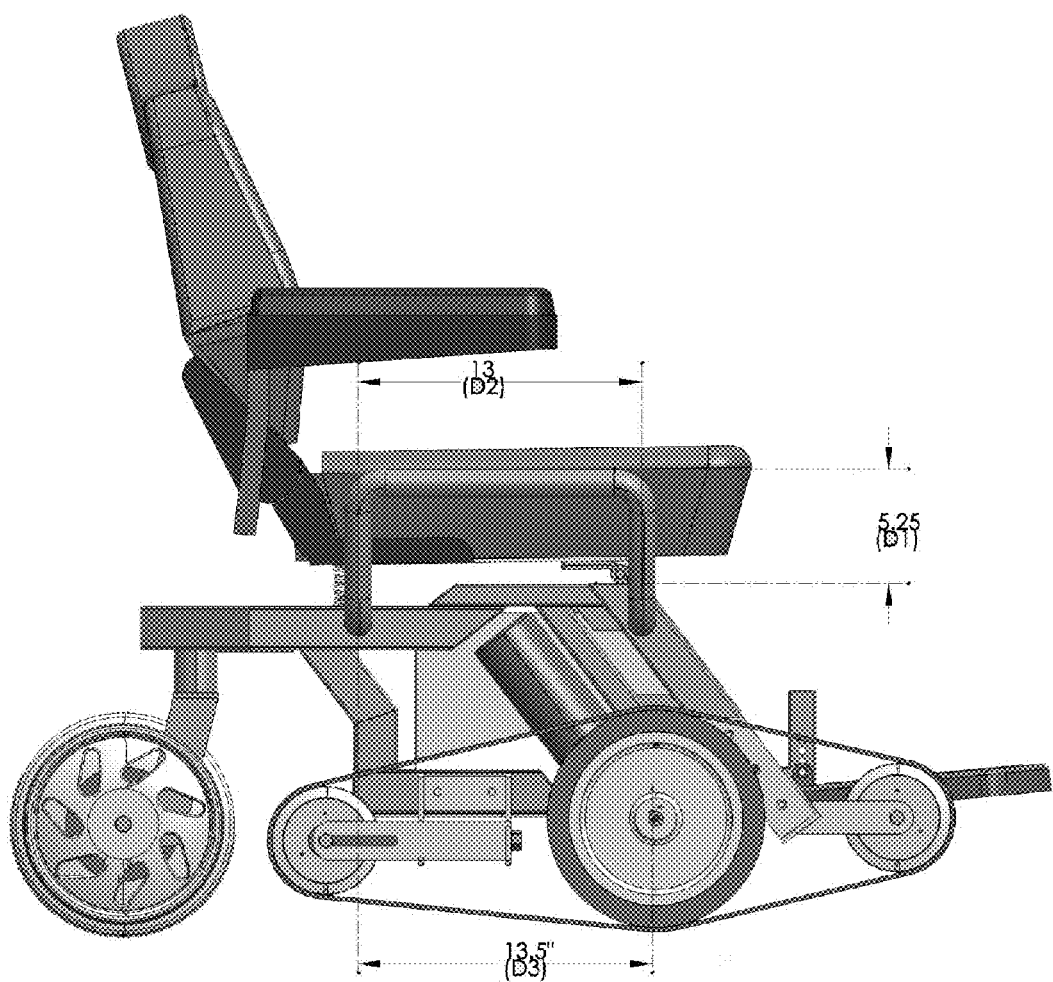
FIG. 17 is front elevational view of the tracked mobility device of FIG. 16.

FIG. 17 is front elevational view of the tracked mobility device of FIG. 16, showing some of the dimensions of the illustrated device.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. In addition, it is to be appreciated that the present invention may comprise or consist essentially of any or all of the illustrated or described devices. For example, the present invention includes devices comprising each of the embodiments illustrated in FIGS. 1 through 13, and the present invention includes devices consisting essentially of any of the embodiments illustrated in FIGS. 1 through 13. Additionally, all of the features and/or embodiments disclosed in Applicant's U.S. Pat. No. 8,371,403, which is incorporated herein by reference, may be combined with any or all of the features disclosed herein to provide a device that comprises or consists essentially of such features.

The invention claimed is:

1. A tracked mobility device, comprising:
   a) a frame supporting a seat;
   b) a pair of track drives connected to said frame, with each track drive comprising a powered center drive wheel, a front roller, a rear roller, and a flexible track;
      wherein said center drive wheel has a first diameter, said front roller has a second diameter, and said rear roller has a third diameter,
      wherein said center drive wheel diameter is at least 20% greater than either said front roller diameter or said rear roller diameter;
   c) a rear wheel assembly connected to said frame and comprising three wheels sharing a common axle, said rear wheel assembly comprising a center wheel having a center wheel diameter, a first outer wheel having a diameter at least 10% smaller than said center wheel diameter, and a second outer wheel having a diameter at least 10% smaller than said center wheel diameter; and
   d) a controller effective for controlling the speed and direction of rotation of each of the track drives.

2. The tracked mobility device of claim 1 wherein each track drive consists essentially of the powered center drive wheel, the front roller, the rear roller, and the flexible track.

3. The tracked mobility device of claim 2 wherein said center drive wheel diameter is at least 80% greater than either said front roller diameter or said rear roller diameter.

4. The tracked mobility device of claim 2 wherein said center drive wheel has a diameter of between 8 inches and 12 inches, said front roller has a diameter between 4 inches and 8 inches, and said rear roller has a diameter between 4 inches and 8 inches.

5. The tracked mobility device of claim 4 wherein said center drive wheel has a diameter of about 10 inches, said front roller has a diameter of about 5 inches, and said rear roller has a diameter of about 5 inches.

6. The tracked mobility device of claim 1 wherein said inner wheel has a diameter of between 8 inches and 12 inches, said first outer wheel has a diameter of between 6 inches and 10 inches, and said second outer wheel has a diameter of between 6 inches and 10 inches.

7. The tracked mobility device of claim 1 wherein said inner wheel has a diameter of about 10 inches, said first outer wheel has a diameter of about 8 inches, and said second outer wheel has a diameter of about 8 inches.

8. The tracked mobility device of claim 1, wherein said center drive wheel comprises a plurality of outwardly extending ridges defining grooves therebetween, and wherein said track comprises a plurality of inwardly extending ridges defining grooves therebetween, and wherein said outwardly extending ridges and said inwardly extending ridges are sized and spaced such that said inwardly extending ridges fit in the grooves formed by said outwardly extending ridges to allow the center drive wheel ridges to mate with the track ridges as the center drive wheel pulls the track.

9. A tracked mobility device, comprising:
   a) a frame supporting a seat;
   b) a pair of track drives connected to said frame, with each track drive comprising a powered drive wheel, a first roller, a second roller, and a flexible track;
      wherein said drive wheel has a first diameter, said first roller has a second diameter, and said second roller has a third diameter,
      wherein said drive wheel diameter is at least 20% greater than either said first roller diameter or said second roller diameter;
   c) a rear wheel assembly connected to said frame and comprising three wheels sharing a common axle, with said three wheels comprising a center wheel having a center wheel diameter, a first outer wheel having a diameter at least 10% smaller than said center wheel diameter, and a second outer wheel having a diameter at least 10% smaller than said center wheel diameter; and
   d) a controller effective for controlling the speed and direction of rotation of each of the track drives.

10. The tracked mobility device of claim 1, wherein a bottom portion of each of said track drives forms a shallow "V" shape that contacts a flat, level ground surface only at an area that is less than the diameter of the center wheel or roller.

11. The tracked mobility device of claim 9 wherein each track drive consists essentially of the powered drive wheel, the front roller, the rear roller, and the flexible track.

12. The tracked mobility device of claim 11 wherein said powered drive wheel has a diameter that is at least 80% greater than either said first roller diameter or said second roller diameter.

13. The tracked mobility device of claim 11 wherein said powered drive wheel has a diameter of between 8 inches and 12 inches, said first roller has a diameter between 4 inches and 8 inches, and said second roller has a diameter between 4 inches and 8 inches.

14. The tracked mobility device of claim 13 wherein said powered drive wheel has a diameter of about 10 inches, said first roller has a diameter of about 5 inches, and said second roller has a diameter of about 5 inches.

15. The tracked mobility device of claim 9 wherein said center wheel has a diameter of between 8 inches and 12 inches, said first outer wheel has a diameter of between 6 inches and 10 inches, and said second outer wheel has a diameter of between 6 inches and 10 inches.

16. The tracked mobility device of claim 9 wherein said center wheel has a diameter of about 10 inches, said first outer wheel has a diameter of about 8 inches, and said second outer wheel has a diameter of about 8 inches.

17. The tracked mobility device of claim 9, wherein said powered drive wheel comprises a plurality of outwardly extending ridges defining grooves therebetween, and wherein said track comprises a plurality of inwardly extending ridges defining grooves therebetween, and wherein said outwardly extending ridges and said inwardly extending ridges are sized and spaced such that said inwardly extending ridges fit in the grooves formed by said outwardly extending ridges to allow the center drive wheel ridges to mate with the track ridges as the drive wheel pulls the track.

18. The tracked mobility device of claim 9, wherein the bottom portion of each of said track drives forms a shallow "V" shape that contacts a flat, level ground surface only at an area that is less than the diameter of the center wheel or roller.

* * * * *